W. BARSCH.
ARTIFICIAL BAIT.
APPLICATION FILED SEPT. 16, 1919.
1,427,147.
Patented Aug. 29, 1922.
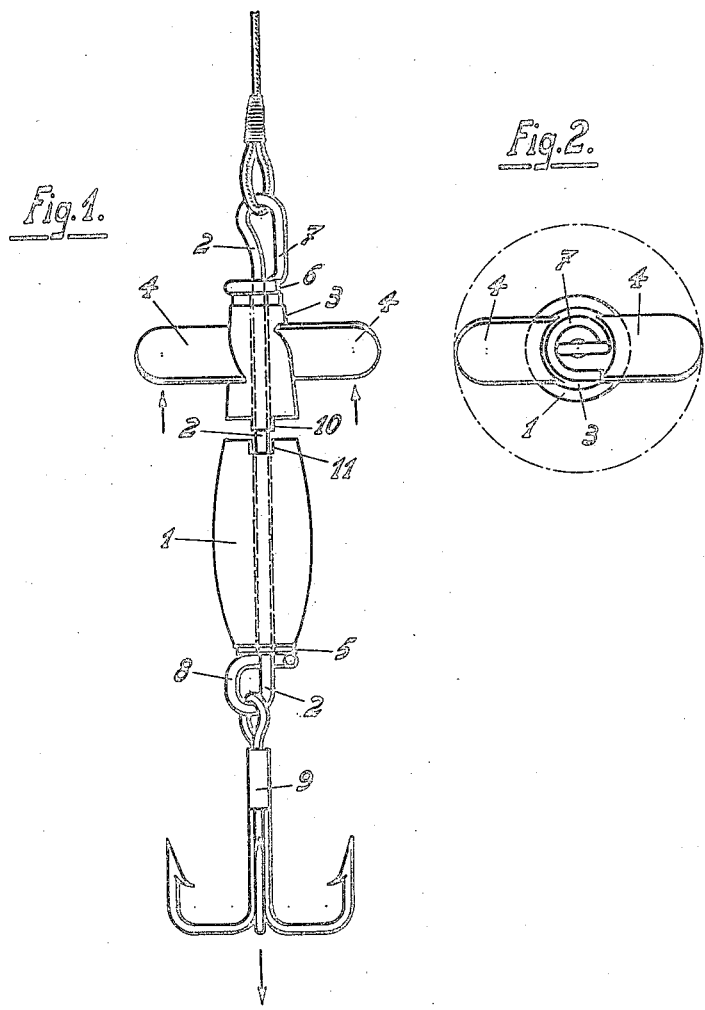
Inventor-
Wilhelm Barsch
By
B. Singer, Atty.

UNITED STATES PATENT OFFICE.

WILHELM BARSCH, OF LUCERNE, SWITZERLAND.

ARTIFICIAL BAIT.

1,427,147.  Specification of Letters Patent.  Patented Aug. 29, 1922

Application filed September 16, 1919. Serial No. 324,168.

*To all whom it may concern:*

Be it known that I, WILHELM BARSCH, engineer, a citizen of the Swiss Confederation, residing at Brambergstrasse No. 48, Lucerne, Switzerland, have invented new and useful Improvements in an Artificial Bait (for which I filed an application in Switzerland, March 27, 1917, Patent No. 75,630), of which the following is a specification.

The present invention relates to an artificial bait provided with a spinning device. Baits of this class are well known but they have the drawback that the fins are attached to the body of the bait in such a manner that when used as a diver, that is without any tension on the line, they do not dive perpendicularly but go down slowly in an irregular way having no appearance of a living fish.

This is due to the fact that the fins have to put the whole body of the spinner into rotation.

To attain a good result it is of great importance that the bait should imitate a living fish not only when spinning that is when drawing on the line but also when diving that is when letting the line go without any tension on it—most of the fishes like the trout or pike lying frequently in wait for their prey on the ground of the river.

The present invention answers the purpose the body of the bait consisting of two loose parts viz the head provided with fins and a back part which is heavier than the head part. Both parts are rotatably mounted on a common pin so that they can move and rotate either together or separately.

Owing to this feature, when used as a diver the back part starts sinking first whilst the head being automatically disconnected starts whirling alone. From the moment the fisher begins to draw on the line by winding it up, the head joins the back part and both parts now whirl as a whole. Therefore, whatever may be the moving position the bait is always "alive".

The bait may be made to resemble any kind of fish.

In the drawing the invention is shown by way of an example:

Fig. 1 is a side view of the spinning device,

Fig. 2 is a top view thereof.

The spinning device comprises a straight piece of wire 2 on which a body portion 1 having a central bore is rotatably mounted. On the wire 2 the spinner 3 is rotatably mounted having two fins 4 set at an angle to the axis of rotation of the spinner. The upper end of the wire 2 is bent to form an eye 7 on which the line is attached, the lower end is bent to form an eye 8 to receive the hook 9. Between the spinner 3 and the eye 7 there is a washer 6 and between the body portion 1 and the loop 8 a washer 5 is arranged. The adjacent faces of the spinner 3 and of the body 1 are formed to act as a clutch, the spinner 3 is provided with a tooth 10 adapted to engage a groove 11 in the body portion 1. The parts 1 and 3 have sufficient play on the wire 2 between the washers 5, 6 that they may be out of engagement (as shown in Fig. 1) and that one may rotate without the other.

When spinning, the device dives in the direction shown by the arrow at the lower end of Fig. 1 the spinner 3 is lifted out of engagement with the body portion 1, the parts assume the position shown in Fig. 1. The spinner 3 is rotated but not the body portion as the resistance offered by the water raises the spinner out of engagement with the body 1, the whole spinning device sinks vertically and offers the appearance of a living bait. If the device is drawn by the line the spinner 3 falls automatically back on the body 1 owing to the opposing pressure of the water on the fins 4. The parts 1 and 3 whirl as whole, the tooth 10 entering notch 11.

The parts 1, 3 may be made of any suitable material for instance metal and the shape thereof may be varied to imitate any natural bait.

What I wish to secure by Letters Patent is:

An artificial bait comprising two loose body parts one of which being a head provided with fins and the other being a back part heavier than the head both rotatably mounted on a common wire pin and axially displaceable thereon, the wire pin forming at each end an open eyelet to receive on one end the line, on the other the fish hook, the two body parts being provided one with a tooth the other with a corresponding groove to work substantially as described and for the purpose set forth.

In testimony whereof I affix my signature in presence of a witness.

WILHELM BARSCH.

Witness:
M. C. GRUETER.